United States Patent [19]

Hattori et al.

[11] 4,083,337
[45] Apr. 11, 1978

[54] AIR-FUEL RATIO ADJUSTING SYSTEM

[75] Inventors: Tadashi Hattori, Okazaki; Takamichi Nakase, Gamagori, both of Japan

[73] Assignee: Nippon Soken, Inc., Nishio, Japan

[21] Appl. No.: 701,967

[22] Filed: Jul. 1, 1976

[30] Foreign Application Priority Data

Jul. 16, 1975   Japan .................................. 50-87495

[51] Int. Cl.² ............................................ F02M 7/14
[52] U.S. Cl. ........................ 123/119 EC; 123/32 EE; 123/98 DB; 123/DIG. 11
[58] Field of Search ......... 123/32 EA, 32 EE, 119 D, 123/119 DB, 119 EC, 198 DB, DIG. 11

[56] References Cited

U.S. PATENT DOCUMENTS

| | | | |
|---|---|---|---|
| 2,153,350 | 4/1939 | Stimac | 123/119 DB |
| 3,759,232 | 9/1973 | Wahl et al. | 123/32 EE |
| 3,874,171 | 4/1975 | Schmidtt et al. | 123/32 EE |

*Primary Examiner*—Samuel Feinberg
*Attorney, Agent, or Firm*—Cushman, Darby & Cushman

[57] ABSTRACT

In an air-fuel ratio adjusting system for internal combustion engine equipped with a carburetor having a bypass air passage for controlling an air-fuel ratio of an air-fuel mixture to be supplied to the engine, a bypass valve disposed in the bypass passage is so arranged as to be restored to its preset position, at which the air-fuel mixture with a proper air-fuel ratio is produced, whenever the engine is stopped, to thereby ensure a smooth starting of the engine even under the low temperature condition.

7 Claims, 4 Drawing Figures

AIR-FUEL RATIO ADJUSTING SYSTEM

The present invention relates to an air-fuel ratio adjusting system for internal combustion engines, and more particularly it relates to an air-fuel ratio adjusting system for an internal combustion engine equipped with an exhaust emission control system (catalytic system) wherein the air-to-fuel ratio of mixtures fed to the engine is controlled in such a manner that the optimum operation of the exhaust emission control system is ensured.

A conventional air-fuel ratio adjusting system of the above type comprises a sensor positioned in the exhaust pipe of an internal combustion engine and designed to detect the concentration of oxygen in the exhaust gases, an air-fuel ratio discriminating circuit for discriminating the relative magnitude of the air-to-fuel of the mixture in accordance with the output signal of the sensor, a pulse motor operated by the air-fuel ratio discriminating circuit and a bypass valve connected to the pulse motor for controlling the passage area of an additional air passage of the carburetor, whereby the air-to-fuel ratio of the mixture fed to the engine is controlled to attain the stoichiometric air-to-fuel ratio.

With the above-described conventional system, however, during the engine cold starting period (where the temperature of the engine itself is low and the mixture is not readily ignitable), the sensor disposed in the exhaust pipe to detect the concentration of oxygen in the exhaust gases, for example, is not able to operate properly and therefore the control of the bypass valve disposed in the additional air passage is temporarily stopped until the engine temperature rises to a value which permits the proper operation of the sensor. Thus, there will be no problem, if, during the engine cold starting period, the bypass valve is placed in a position which provides the required air-to-fuel ratio for smooth starting of the engine (the ratio which is slightly smaller than the stoichiometric air-to-fuel ratio). However, if the engine is started under the low temperature condition with the bypass valve placed in a position which provides an air-to-fuel ratio greater than the stoichiometric one, until the engine temperature rises to a certain value, the bypass valve will not be controlled and it will be held in the initial position with the result that despite the fact that the engine must be fed with a mixture having a smaller air-to-fuel ratio than the stoichiometric one, the engine will be fed with only such mixture having a greater air-to-fuel ratio than the stoichiometric one, thus making it impossible to ensure smooth starting of the engine.

With a view to overcoming the foregoing difficulty, it is an object of this invention to provide an air-fuel ratio adjusting system for an internal combustion engine comprising an air-fuel ratio sensor for detecting the concentration of oxygen in the exhaust gases to detect the air-to-fuel ratio of the mixture, a bypass valve disposed in an additional air passage of the carburetor, driving means for controlling the opening of the bypass valve, control means for discriminating the relative magnitude of the air-to-fuel ratio of the mixture in accordance with the output signal of the air-fuel ratio sensor, and a power circuit whereby when a key switch for controlling the supply of power to the control means is opened (when the engine is stopped) the supply of power to the control means is continued for a predetermined time from the time of the opening of the key switch and a position correcting signal is applied to the control means so as to move the bypass valve into its preset position (the bypass valve is normally preset to its fully closed position) which provides a mixture with the required air-to-fuel ratio for engine cold starting purposes (the ratio which is slightly smaller than the stoichiometric air-to-fuel ratio), whereby when the engine is at rest the bypass valve is always held in the preset position and thus during periods of engine starting, particularly during periods of cold engine starting a mixture with the required air-to-fuel ratio for engine starting purposes is fed to the engine to always ensure smooth starting of the engine.

The above and other objects, features and advantages of this invention will be readily apparent from the following detailed description taken in conjunction with the accompanying drawings, in which.

The present invention will now be described in greater detail with reference to the illustrated embodiments.

Figure 1:
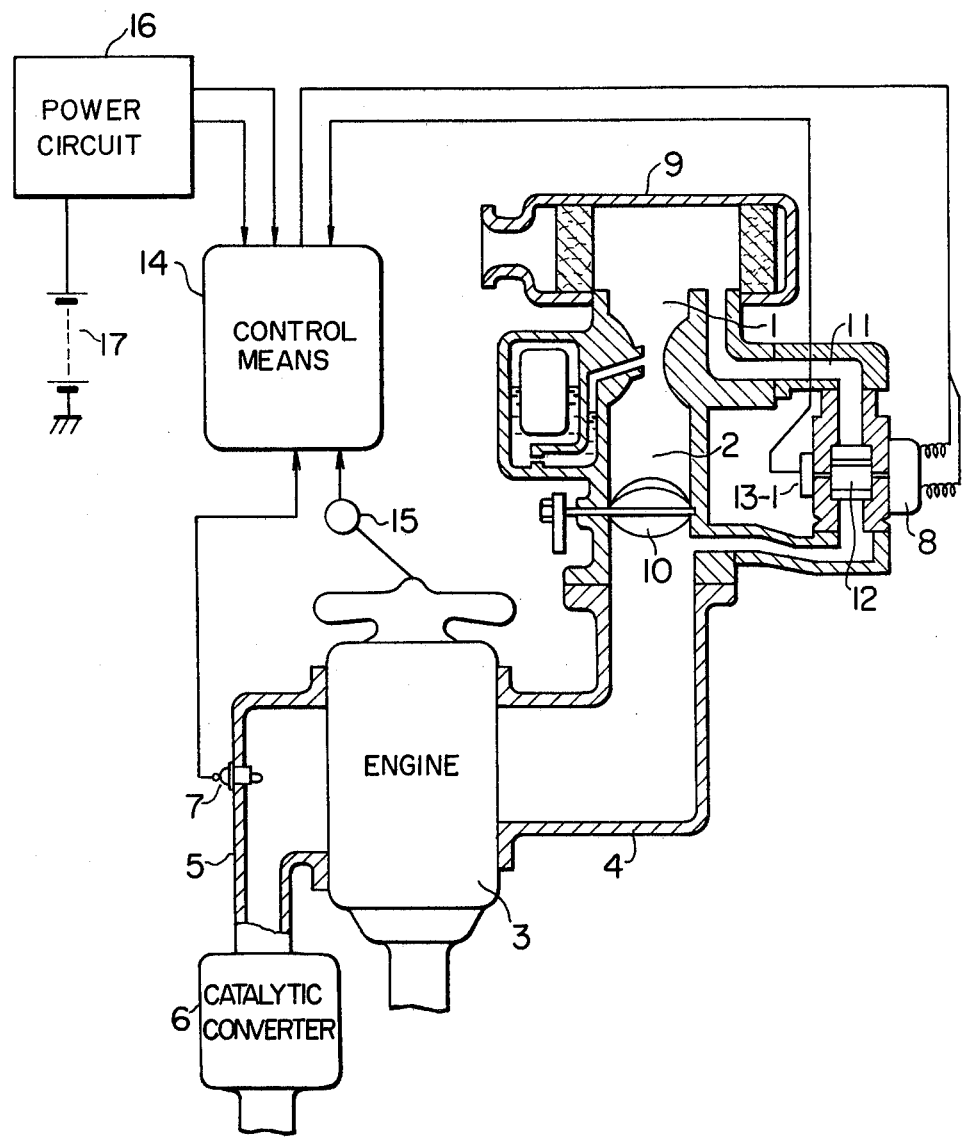
FIG. 1 is a schematic sectional view showing an embodiment of an air-fuel ratio adjusting system according to the invention.
Figure 3:
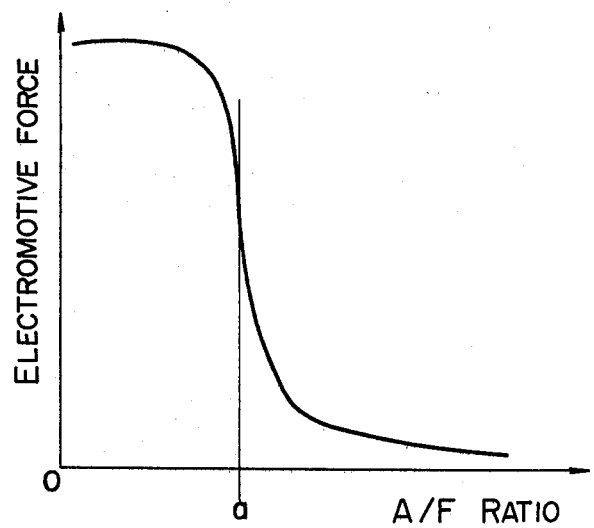
FIG. 3 is a characteristic diagram of the air-fuel ratio sensor.

Referring now to FIG. 1 showing a first embodiment of the system of this invention, numeral 1 designates a carburetor in which the passage area of a main mixture passage 2 is controlled by a throttle valve 10. The carburetor 1 communicates with both an air cleaner 9 and an intake manifold 4 of an internal combustion engine 3. The carburetor 1 further includes an additional air passage 11 by which the air cleaner 9 communicates with the carburetor 1 downstream of the throttle valve 10, a bypass valve 12 for controlling the passage area of the additional air passage 11, driving means 8 for controlling the opening of the bypass valve 12 which may for example be a pulse motor, and a preset position sensor 13-1 for detecting whether the bypass valve 12 is in a position which enables the carburetor to provide an air-fuel mixture with a required air-to-fuel ratio for smoothly starting the engine 3 under the low temperature condition (this position will hereinafter be referred to as a preset position and considered as corresponding to the fully closed position of the bypass valve 12). Numeral 5 designates an exhaust manifold into which the exhaust gases of the engine 3 are discharged and from which the exhaust gases are exhausted to the atmosphere through an exhaust emission control system such as a catalytic converter 6. Numeral 7 designates an air-fuel ratio sensor comprising an oxygen concentration sensor such as zirconium oxide disposed in the exhaust manifold 5, which generates an electromotive force corresponding to the concentration of oxygen in the exhaust gases and particularly it has an output voltage characteristic so that its output voltage changes in a step fashion at near the stoichiometric air-to-fuel ratio as shown in FIG. 3.

Numeral 15 designates an operating condition sensor for detecting the operating conditions of the engine such as the temperature of the engine, and it particularly detects whether the engine temperature has risen to an active temperature (about 400° C) which permits the proper operation of the air-fuel ratio sensor 7 disposed in the exhaust manifold 5.

Numeral 14 designates control means responsive to the outputs of the air-fuel ratio sensor 7, the preset position sensor 13-1 and an operating condition sensor 15, whereby in the normal operating condition of the engine 3, the relative magnitude of the air-to-fuel ratio of the mixture fed to the engine 3 is discriminated from the concentration of oxygen in the exhaust gases and the opening of the bypass valve 12 is controlled through the driving means 8 thereby controlling the air-to-fuel ratio of the mixture to attain the stoichiometric one. When performing this control, of course the control means 14 is supplied with power from a vehicle DC power source 17 through a power circuit 16. The power circuit 16 is designed so that at the instant that a key switch 16-1 (FIG. 2) is closed power is supplied to the control means 14, whereas when the key switch 16-1 is opened the supply of power to the control means 14 is continued for a predetermined time from the time of the opening of the key switch 16-1 and at the same time a position correcting signal is applied to the control means 14.

Figure 2:
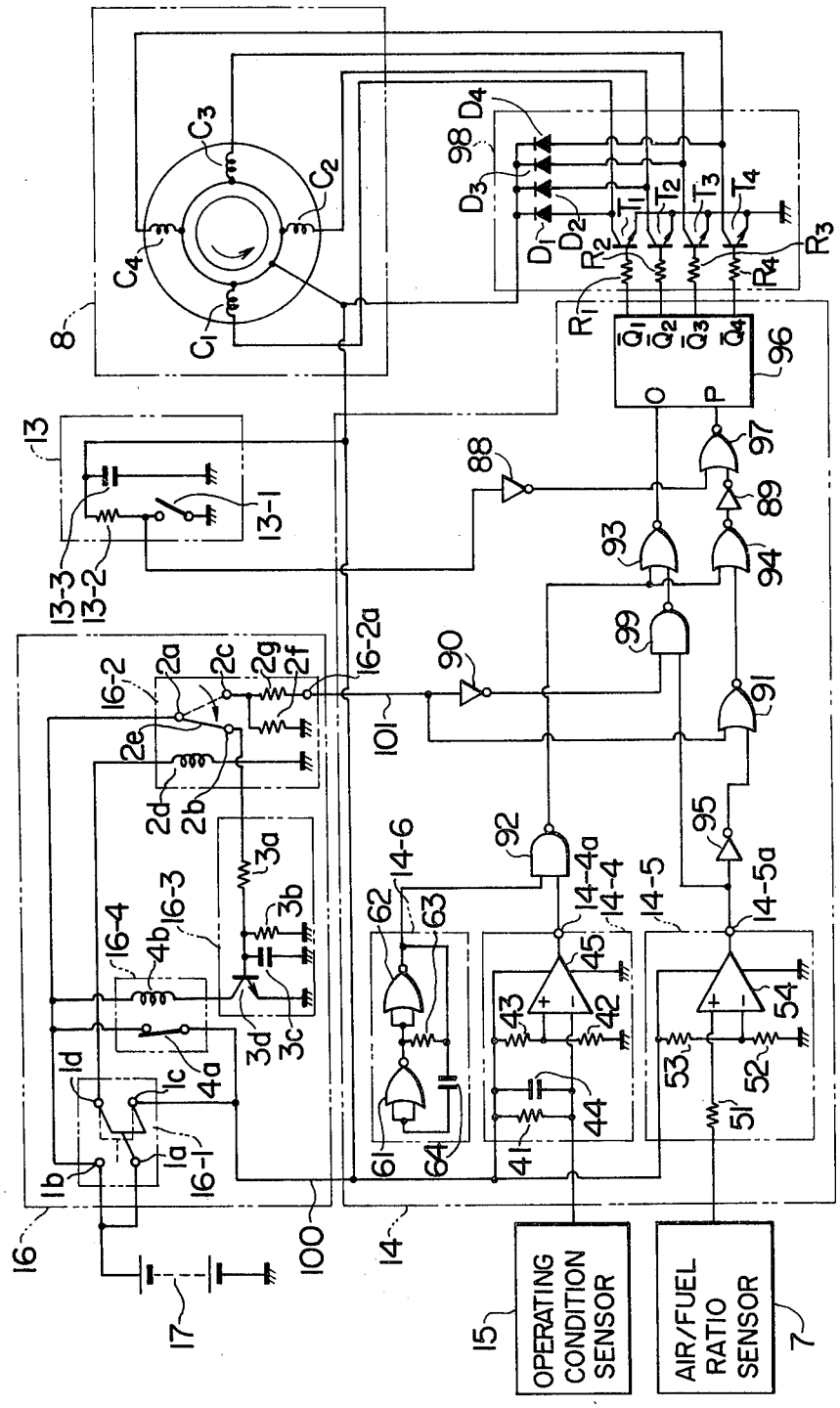
FIG. 2 is a wiring diagram for the control means and the power circuit shown in FIG. 1.

The construction of the control means 14 and the power circuit 16 will now be described in detail with reference to FIG. 2.

In the Figure, numeral 14-4 designates an operating condition detecting circuit comprising resistors 41, 42 and 43, a capacitor 44 and a comparator 45 whose inverting input terminal is connected to the operating condition sensor 15 and the voltage of the power source 17 is divided by the resistors 42 and 43 applying the resulting preset voltage to the noninverting input terminal of the comparator 45. The operating condition sensor 15 comprises a thermistor or the like whose resistance value decreases as the engine temperature rises and the preset voltage is preset to a value corresponding to a temperature (about 400° C) which permits the proper operation of the air-fuel ratio sensor 7. Consequently, when the engine temperature rises so that the voltage of the power source 17 which was divided by the resistance values of the operating condition sensor 15 and the resistor 41 becomes lower than the preset voltage, a "1" level signal is generated at an output terminal 14-4a of the operating condition detecting circuit 14-4.

Numeral 14-5 designates an air-fuel ratio discriminating circuit comprising a resistor 51, a comparator 54 and voltage dividing resistors 52 and 53 for applying a preset voltage to the inverting input terminal of the comparator 54 whose noninverting input terminal is connected to the air-fuel ratio sensor 7 through the resistor 51. As shown in FIG. 3, the air-fuel ratio sensor 7 has an electromotive force or voltage characteristic such that the output voltage is high when the detected air-to-fuel ratio is smaller than the stoichiometric one (indicated at a point a), whereas when the detected air-to-fuel ratio exceeds the stoichiometric one the output voltage decreases in a step fashion. The preset voltage determined by the voltage dividing resistors 52 and 53 is preset slightly lower than the output voltage of the air-fuel ratio sensor 7 generated at near the stoichiometric air-to-fuel ratio. Consequently, when the air-to-fuel ratio of the mixture which was detected by the air-fuel ratio sensor 7 is smaller and thus its output voltage is high, namely, when the mixture is rich, a "1" level signal is generated at an output terminal 14-5a of the air-fuel ratio detecting circuit 14-5.

Numeral 14-6 designates a pulse generator comprising NOR gates 61 and 62, a resistor 63 and a capacitor 64 and the output pulse signals of the pulse generator 14-6 are applied to one input terminal of a NAND gate 92 whose other input terminal is connected to the operating condition detecting circuit 14-4. When a "1" level signal is generated at the output terminal 14-4a of the operating condition detecting circuit 14-4, namely, when the engine temperature has reached the temperature which permits the proper operation of the air-fuel ratio sensor 7, the NAND gate 92 applies the pulse signals from the pulse generator 14-6 to one input terminal of NOR gates 93 and 94, respectively. The output terminal 14-5a of the air-fuel ratio discriminating circuit 14-5 is connected to one input terminal of a NAND gate 99 and to one input terminal of a NOR gate 91 through an inverter 95.

The other input terminal of the NOR gate 91 is connected through a line 101 to an output terminal 16-2a of a first relay 16-2 which will be described later, and the other input terminal of the NAND gate 99 is connected to the output terminal 16-2a through an inverter 90 and the line 101.

When the key switch 16-1 which will be described later is closed, a "0" level signal is generated at the output terminal 16-2a so that this "0" signal is inverted by the inverter 90 and the resulting "1" level signal is applied to the other input terminal of the NAND gate 99. Consequently, only when a "1" level signal is generated at the output terminal 14-5a of the air-fuel ratio detecting circuit 14-5, a "0" level signal is applied to the other input terminal of the NOR gate 93 with the result that the NOR gate 93 applies the pulse signals applied to its one input terminal from the pulse generator 14-6 to a first input terminal 0 of a shift register 96.

On the other hand, when a "0" level signal is generated at the output terminal 14-5a of the air-fuel ratio detecting circuit 14-5, this "0" level signal is inverted by the inverter 95 and the resulting "1" level signal is applied to the one input terminal of the NOR gate 91. Consequently, the NOR gate 91 applies a "0" level signal to the other input terminal of the NOR gate 94 so that the pulse signals applied from the pulse generator 14-6 to the one input terminal of the NOR gate 94 are applied to one input terminal of a NOR gate 97 through an inverter 89. The other input terminal of the NOR gate 97 is connected through an inverter 88 to preset position detecting means comprising the preset position sensor 13-1, a resistor 13-2 and a capacitor 13-3.

The preset position sensor 13-1 is closed only when the bypass valve 12 is in its preset position or the fully closed position and it is opened when the bypass valve 12 is in any other position. Consequently, when the bypass valve 12 is not in the preset position, a "0" level signal is applied to the other input terminal of the NOR gate 97 so that if the pulse signals have been introduced at the one input terminal of the NOR gate 97 at that time, these pulse signals are applied to a second input terminal P of the shift register 96.

The power circuit 16 comprises the key switch 16-1 which is a two-circuit switch, the first relay 16-2, a delay circuit 16-3 and a second relay 16-4.

The first relay 16-2 comprises a first stationary contact 2a connected to a second contact 1b of the key switch 16-2, a movable member 2e which is connected to the stationary contact 2a, second and third stationary contacts 2b and 2c, a relay coil 2d connected to a fourth contact 1d of the key switch 16-1 and resistors 2f and 2g connected to the stationary contact 2c, whereby when the key switch 16-1 is closed as shown by the solid lines in the Figure, the relay coil 2d is energized and the first and second stationary contacts 2a and 2b are connected with each other by the movable member 2e as shown by the solid line.

Consequently, when the key switch 16-1 is closed, a "0" level signal is generated at the output terminal 16-2a of the first relay 16-2 as mentioned earlier. The delay circuit 16-3 comprises resistors 3a and 3b, a capacitor 3c and a transistor 3d and the base of the transistor 3d is connected to the second stationary contact 2b through the resistor 3a. Thus, when the movable member 2e is connected to the second stationary contact 2b, the transistor 3d is turned on and the capacitor 3c is simultaneously charged.

The second relay 16-4 comprises a relay coil 4b connected between the second stationary contact 1b of the key switch 16-1 and the collector-emitter circuit of the transistor 3d and normally open contacts 4a which may be moved into the closed position by the relay coil 4b.

Numeral 98 designates a switching circuit connected to the shift register 96 comprising resistors $R_1$, $R_2$, $R_3$ and $R_4$, transistors $T_1$, $T_2$, $T_3$ and $T_4$ and and counter electromotive force abosrbing diodes $D_1$, $D_2$, $D_3$ and $D_4$, and the collector-emitter circuits of the transistors $T_1$ to $T_4$ are respectively connected in series with field coils $C_1$, $C_2$, $C_3$ and $C_4$ of the pulse motor 8.

With the construction described above, the operation of the first embodiment is as follows. When the key switch 16-1 is closed, the first contact 1a is connected to both the third and fourth contacts 1c and 1d. The control means 14 is, therefore, energized by the power circuit 16 through a cable 100. Simultaneously, the relay coil 2d is energized so that the movable member 2e is engaged with the second stationary contact 2b and the transistor 3d is turned on. Thus, the relay coil 4b is energized and the normally open contacts 4a are closed supplying power to the cable 100 through the normally open contacts 4a.

When the temperature of the engine 3 remains below the active temperature (about 400° C) of the air-fuel ratio sensor 7, the operating condition detecting circuit 14-4 generates a "0" level signal at its output terminal 14-4a and thus the NAND gate 92 does not apply the pulse signals from the pulse generator 14-6 to the NOR gates 93 and 94. Consequently, the shift register 96 receives no pulse signals at either of its first and second input terminals O and P and thus the bypass valve 12 is not rotated in either direction.

Then, when the engine temperature rises so that the operating condition detecting circuit 14-4 generates a "1" level signal at its output terminal 14-4a, the pulse signals from the pulse generator 14-6 are applied to the one input terminal of the NOR gates 93 and 94, respectively.

Then, when the air-fuel ratio discriminating circuit 14-5 detects, in response to the output signal of the air-fuel ratio sensor 7, that the mixture is rich, namely, the air-to-fuel ratio of the mixture is smaller than the stoichiometric one, a "1" level signal is generated at its output terminal 14-5a and this "1" level signal is applied to the one input terminal of the NAND gate 99. Since the "0" level signal generated at the output terminal 16-2a has been inverted by the inverter 90 thus applying the resulting "1" level signal to the other input terminal of the NAND gate 99, the NAND gate 99 applies a "0" level signal to the other input terminal of the NOR gage 93 so that the pulse signals applied to the one input terminal of the NOR gage 93 are applied to the first input terminal 0 of the shift register 96.

When the pulse signals are applied to the first input terminal 0 of the shift register 96, its output terminals $\bar{Q}_1$, $\bar{Q}_2$, $\bar{Q}_3$ and $\bar{Q}_4$ are sequentially shifted so that the transistors $T_1$ to $T_4$ of the switching circuit 98 are sequentially turned on and the field coils $C_1$ to $C_4$ of the pulse motor 8 are sequentially energized thus rotating the pulse motor 8 in the direction of the arrow in the Figure and thereby operating the bypass valve 12 in a direction which opens it.

When the bypass valve 12 is operated in the direction which opens it, the rate of flow of the air through the additional air passage 11 is increased and the air-to-fuel ratio of the mixture is increased to attain the stoichiometric one.

On the contrary, when the air-fuel ratio discriminating circuit 14-5 detects, in response to the output signal of the air-fuel ratio sensor 7, that the mixture is lean, namely, the air-to-fuel ratio of the mixture is greater than the stoichiometric one, a "0" level signal is generated at its output terminal 14-5a so that this "0" level signal is inverted by the inverter 95 and the resulting "1" level signal is applied to the one input terminal of the NOR gate 91. Thus, the NOR gate 91 applies a "0" level signal to the other input terminal of the NOR gate 94 and the pulse signals applied to the one input terminal of the NOR gate 94 from the pulse generator 14-6 are applied to the one input terminal of the NOR gate 97 through the inverter 89. In this case, when a "0" level signal has been applied to the other input terminal of the NOR gate 97, namely, when the bypass valve 12 is not in the preset position (the fully closed position) and thus the preset position sensor 13 is open, the NOR gate 97 applies the pulse signals applied to its one input terminal to the second input terminal P of the shift register 96.

When the pulse signals are applied to the second input terminal P of the shift register 96, its output terminals $\bar{Q}_4$, $\bar{Q}_3$, $\bar{Q}_2$ and $\bar{Q}_1$ are shifted sequentially so that the transistors $T_4$, $T_3$, $T_2$ and $T_1$ are sequentially turned on and the field coils $C_4$, $C_3$, $C_2$ and $C_1$ of the pulse motor 8 are sequentially energized, thus rotating the pulse motor 8 in a direction opposite to the direction of the arrow in the Figure and thereby operating the bypass valve 12 in a direction which closes it.

When the bypass valve 12 is rotated in the direction which closes it, the rate of flow of the air through the additional air passage 11 is decreased and thus the air-to-fuel ratio of the mixture is decreased to attain the stoichiometric one.

On the contrary, when a "1" level signal has been applied to the other input terminal of the NOR gate 97, namely, when the bypass valve 12 is in the preset position (the fully closed position), the NOR gate 97 does not apply the pulse signals to the second input terminal P of the shift register 96 and in this way the pulse motor 8 is prevented from operating the bypass valve 12 further in the direction which closes it despite the fact that the bypass valve 12 has been brought into the fully closed position, thus preventing the occurrence of such troubles as damages to the bypass valve 12 and burning of the pulse motor 8.

Next, the operation of the first embodiment during the stopping period of the engine will be described.

When the key switch 16-1 is opened as shown by the broken lines in the Figure, the contacts 1a and 1c are separated. The relay coil 2d is also de-energized with the result that the movable member 2e connects the first and third stationary contacts 2a and 2c with each other as shown by the broken line and a "1" level signal constituting a position correcting signal is generated at the output terminal 16-2a of the first relay 16-2. The transistor 3d of the delay circuit 16-3 is held in the conductive state by the discharging of the capacitor 3c for a predetermined time from the time of the opening of the key switch 16-1. Consequently, the cable 100 is continuously connected to the power source 17 during the time that the normally open contacts 4a are held closed and power is continuously supplied to the control means 14 for the predetermined time from the time of the opening of the key switch 16-1.

On the other hand, the "1" level signal generated at the output terminal 16-2a as mentioned earlier is applied to the other input terminal of the NOR gate 91 which in turn applies a "0" level signal to the other input terminal of the NOR gate 94.

Since the temperature of the engine immediately after the opening of the key switch 16-1 is almost the same with that attained when the engine was operating, the "1" level signal remains on at the output terminal 14-4a of the operating condition detecting circuit 14-4 and consequently the NAND gate 92 continuously applies the pulse signals from the pulse generator 14-6 to the NOR gates 93 and 94.

Consequently, the NOR gate 94 applies the pulse signals to the one input terminal of the NOR gate 97 so that when the bypass valve 12 is not in the fully closed position thus applying a "0" level signal to the other input terminal of the NOR gate 97, the pulse signals are applied to the second input terminal P of the shift register 96 and the bypass valve 12 is operated in the direction which closes it as mentioned earlier, thus eventually bringing the bypass valve 12 into the preset position (the fully closed position).

On the other hand, even if the "1" level signal has been generated at the output terminal 14-5a of the air-fuel ratio discriminating circuit 14-5 when the key switch 16-1 is opened, the "1" level signal generated at the output terminal 16-2a is inverted by the inverter 90 and the resulting "0" level signal is applied to the other input terminal of the NAND gate 99, thus applying a "1" level signal to the other input terminal of the NOR gate 93 and thereby preventing the application of the pulse signals to the first input terminal 0 of the shift register 96.

Consequently, each time the engine is stopped, the bypass valve 12 is always brought into the preset position so that during cold starting periods of the engine a mixture with the required air-to-fuel ratio for engine cold starting purposes is always fed to the engine, thus ensuring smooth starting of the engine.

Figure 4:
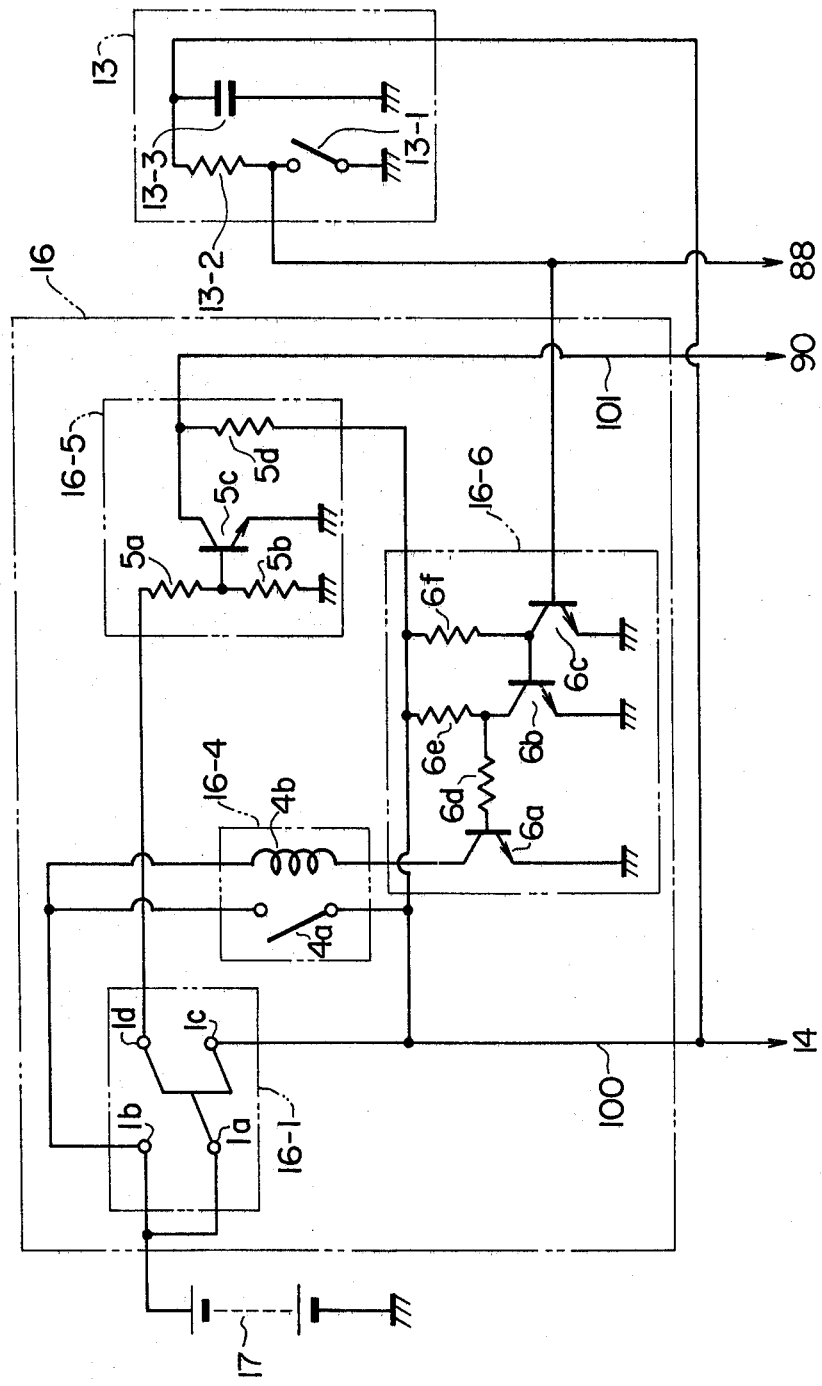
FIG. 4 is a wiring diagram of the power circuit constituting a principal part of another embodiment of the system of the invention.

Next, a second embodiment of the invention shown in FIG. 4 will now be described.

In the Figure illustrating details of a power circuit 16 constituting a principal part of the second embodiment, numerals 16-1 and 16-4 respectively designate a key switch and a relay of the same type as used in the first embodiment, 16-5 a signal circuit whereby a "0" level signal is applied to the cable 101 when the key switch 16-1 is closed, whereas a "1" level signal or position correcting signal is applied to the inverter 90 through the cable 101 when the key switch 16-1 is opened, 16-6 a delay circuit connected to the preset position detecting means 13 for energizing the relay coil 4b to continuously close the normally open contacts 4a until the preset position sensor 13-1 is closed.

The signal circuit 16-5 comprises resistors 5a, 5b and 5d and a transistor 5c and the resistors 5a and 5b are connected to the fourth contact 1d, whereby the transistor 5c remains on so far as the key switch 16-1 remains closed.

The cable 101 is connected to the collector of the transistor 5c so that a "0" level signal is continuously generated on the cable 101 so far as the transistor 5c remains on.

The delay circuit 16-6 comprises a transistor 6a connected in series with the relay coil 4b, transistors 6b and 6c preceding the transistor 6a and resistors 6d, 6e and 6f and the base of the transistor 6c is connected to the preset position detecting means 13.

The operation of the above-described second embodiment is as follows.

When the key switch 16-1 is closed, power is supplied to the control means 14 through the contacts 1a and 1c and the cable 100. At this time, when the bypass valve 12 is not in the preset position thus opening the preset position sensor 13-1, the transistor 6c is turned on and the relay coil 4b is energized, thus closing the normally open contacts 4a and thereby supplying power to the control means 14 through the contacts 4a and the cable 100.

When the key switch 16-1 is opened to stop the operation of the engine, the contacts 1a and 1c are separated and the power is supplied no longer through the contacts 1a and 1c.

In this case, if the bypass valve 12 is not in the preset position or the fully closed position when the key switch 16-1 is opened, the preset position sensor 13-1 is open and the transistors 6c and 6a are still held on, thus holding the normally open contacts 4a in the closed position and thereby continuously supplying the power to the control means 14 through the normally open contacts 4a and the cable 100.

On the other hand, the transistor 5c is turned off in response to the opening of the key switch 16-1 and a "1" level signal or position correcting signal is applied to the NOR gate 91 through the cable 101. Consequently, in the like manner as described in connection with the first embodiment, the bypass valve 12 is operated by the position correcting signal in the direction which closes it. When the bypass valve 12 is brought into its preset position or fully closed position, the preset position sensor 13-1 is closed and the transistors 6c and 6a are turned off. As a result, the normally open contacts 4a are opened stopping the supply of the power to the control means 14 through the cable 100.

Thus, each time the engine is stopped, the bypass valve 12 is always brought into its preset position so that whenever the engine is started under the low temperature condition, the engine is always fed with a mixture with the required air-to-fuel ratio for engine cold starting purposes, thus ensuring smooth starting of the engine.

While, in the above-described embodiments of this invention, the fully closed position of the bypass valve is used as its preset position, any other valve position may be used in which case it is of course necessary to provide position detecting means such as a potentiometer for detecting the position of the bypass valve and means responsive to the output signal of the position detecting means and the position correcting signal for applying pulse signals to either of the first and second input terminals of the shift register.

What is claimed is:

1. An air-fuel ratio adjusting system for an internal combustion engine comprising:
    a carburetor connected to an intake manifold of an internal combustion engine and including a main passage and a bypass passage for supplying an air-fuel mixture to said engine;
    said main passage being provided with a main valve for controlling the amount of the air-fuel mixture to be supplied to said engine, and said bypass passage being provided with a bypass valve for adjusting the air-fuel ratio of said air-fuel mixture by controlling the amount of air flowing therethrough;
    driving means coupled to said bypass valve for driving the same;
    air-fuel ratio sensing means mounted in an exhaust manifold of said engine for sensing the air-fuel ratio of the mixture supplied to said engine;
    a source of direct current;
    a key switch of said engine connected to said source;
    a control circuit means connected to said source through said key switch, whereby direct current is supplied to said control circuit means when said key switch is closed, said control circuit means being connected to both said air-fuel ratio sensing means for actuating said driving means to drive said bypass valve in a valve opening direction when the air-fuel ratio is below a predetermined value and in a valve closing direction when the air-fuel ratio exceeds the predetermined value;
    a delay circuit means connected between said source and said control circuit means for supplying said control circuit means with direct current from said source for a predetermined time after said key switch is opened, to thereby hold said control circuit means operable;
    generating means connected to said key switch for generating a trigger signal when said key switch is opened; and
    means for applying said trigger signal to said control circuit means, whereby said control circuit means upon receiving said trigger signal actuates said driving means to drive said bypass valve in a direction to a preset position at which said bypass valve enables said carburetor to supply air-fuel mixture having a proper air-fuel ratio to said engine.

2. An air-fuel ratio adjusting system as set forth in claim 1, further comprising position detecting means for detecting the position of said bypass valve and for generating a position signal when said bypass valve is placed at said preset position, said position signal being supplied to said control circuit means to stop the actuation of said driving means.

3. An air-fuel ratio adjusting system as set forth in claim 1, further comprising:
    temperature detecting means for detecting the temperature of said engine, the output therefrom being supplied to said control circuit means to thereby enable said control circuit means to operate when the temperature of said engine exceeds a predetermined value.

4. An air-fuel ratio adjusting system as set forth in claim 1, wherein said delay circuit means comprises:
    a first relay having a relay coil connected across said source of direct current through said key switch, a movable contact connected at one end to said source of direct current and a first and a second stationary contact, said movable contact being normally contacted with said second stationary contact, said movable contact being energized to be contacted with said first stationary contact by the energization of said relay coil;
    a transistor having a base connected to said first stationary contact;
    a capacitor connected across the base and emitter of said transistor; and
    a second relay having a relay coil connected across said source of direct current through the collector-emitter path of said transistor and normally-opened contacts operatively connected between said source of direct current and said control circuit means, said contacts being energized to close by the energization of said relay coil of said second relay.

5. An air-fuel ratio adjusting system as set forth in claim 4, wherein said trigger signal generating means comprises an electrical connection connected between said second stationary contact of said first relay and said control circuit means.

6. An air-fuel ratio adjusting system as set forth in claim 2, wherein said delay circuit means comprises:
    a transistor having a base operatively connected to said position detecting means, the collector-emitter path thereof is conducting until said position signal generated at said position detecting means; and
    a relay having a relay coil connected across said source of direct current through said collector-emitter path and a normally-opened contacts operatively connected between said source of direct current and said control circuit means, said contacts being energized to close by the energization of said relay coil, whereby said control circuit means is kept operable so long as said bypass valve is placed at a position other than said preset position.

7. An air-fuel ratio adjusting system as set forth in claim 6, wherein said trigger signal generating means comprises:
    a transistor having a base operatively connected to said source of direct current through said key switch;
    conductor means for connecting the collector-emitter path of said transistor across said source of direct current through said normally-opened contacts; and
    conductor means connecting the collector of said transistor to said control circuit means.

* * * * *